(12) United States Patent
Unger (10) Patent No.: US 8,295,364 B2
(45) Date of Patent: Oct. 23, 2012

(54) SYSTEM AND METHOD OF VIDEO DATA ENCODING WITH MINIMUM BASEBAND DATA TRANSMISSION

(75) Inventor: Bob Unger, El Cajon, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 783 days.

(21) Appl. No.: 12/417,482

(22) Filed: Apr. 2, 2009

(65) Prior Publication Data

US 2010/0254452 A1 Oct. 7, 2010

(51) Int. Cl.
*H04N 7/081* (2006.01)
*H04N 7/24* (2006.01)
*H04N 7/01* (2006.01)

(52) U.S. Cl. .................... 375/240.26; 348/589

(58) Field of Classification Search ............. 375/240, 375/240.26; 386/351; 348/589
See application file for complete search history.

(56) References Cited

U.S. PATENT DOCUMENTS

| 4,816,913 A * | 3/1989 | Harney et al. ............ 375/240.08 |
| 5,394,196 A | 2/1995 | Robert |
| 7,308,159 B2 | 12/2007 | Ruggiero |
| 2001/0024526 A1 * | 9/2001 | Kadono ................... 382/238 |
| 2002/0149696 A1 | 10/2002 | Cok |
| 2003/0059122 A1 * | 3/2003 | Boon ...................... 382/240 |
| 2004/0179745 A1 * | 9/2004 | Breeuwer et al. ........ 382/243 |
| 2007/0291845 A1 * | 12/2007 | Cammas et al. ........ 375/240.16 |

FOREIGN PATENT DOCUMENTS

| WO | 9512289 A1 | 5/1995 |
| WO | 2006064250 A1 | 6/2006 |

OTHER PUBLICATIONS

National Semiconductor, "LM 8207 TFT 18 Gamma Buffer + Vcom Driver + Voltage Reference" (Sep. 2005).*
ISO 11172-2 (MPEG-1 Video Part 2) 1993.*

* cited by examiner

*Primary Examiner* — David Czekaj
*Assistant Examiner* — David N Werner
(74) *Attorney, Agent, or Firm* — John P. O'Banion (57) ABSTRACT

Just-in-time up-conversion utilizes frame tagging, and optionally pixel tagging, to minimize the data bandwidth required to drive a display. According to this approach video is maintained in its native frame rate until needed in the display device, such as for pixel control at the row/column drivers. By way of example, a frame tag comprises a repeat count and direction information upon which display refresh is based. In addition, pixel tagging can be utilized to dynamically configure the up-converter to generate pixel displacements within synthesized intermediate frames, such as based on different pixel layer representations. The data stream can utilize traditional fixed pixel lengths or variable pixel lengths to conserve additional bandwidth.

23 Claims, 5 Drawing Sheets

SYSTEM AND METHOD OF VIDEO DATA ENCODING WITH MINIMUM BASEBAND DATA TRANSMISSION

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to displaying video, and more particularly to communication of tagged video and its up-conversion at the point of display.

2. Description of Related Art

Video communication is widespread throughout our modern society, as video broadcasts are sent over airwaves and over cable TV connections, received by satellite links, communicated over high speed phone lines, and traverse a variety of wired and wireless networks including the internet toward being received by a video driver and output to a display device for viewing by the user. These users expect to view increasingly higher definition video that is sharp and smooth. However, the limits of communication bandwidth to the display device often impairs satisfying these increasing user desires.

Video streams, and in particular high-definition video, requires substantial bandwidth to reach a video display. It will be noted that video is traditionally captured at 24 or 30 frames per second (fps). The legacy standard is 24 fps adopted from film and is strongly entrenched, in particular among cinematographers. Conventional movie projectors advance from one frame of the film media to the next frame 24 times each second. Yet, each frame is illuminated two or three times before the next frame is projected using a shutter in front of its lamp. As a result, the movie projector runs at 24 frames per second, but has a 48 or 72 Hz refresh rate. The higher refresh rate reduces the flickering which would otherwise result if the refresh rate matched the framing rate. Variations from 24 fps capture ("under-cranking" and "over-cranking") are presently utilized in creation of special effects (e.g. slow motion), while playback is still performed at the 24 fps rate despite the capture rate. While framing rates of 30 fps are legacy standards for video based capture, such as in response to the line frequency of the AC mains which distribute AC power (e.g., 30 fps progressive, 60 fps interlaced, and rates based on 50 Hz power distributions).

Video editing is usually performed using the native (nominal) frame rate of the captured source. Thus, the creative phase of the process typically remains in the native frame rate, to which subsequent rate conversions and compressions are applied as part of the distribution and display process. Techniques such as 3:2 pull-down are used to convert between film and video rates. This may involve duplicating or merging selective frames.

In modern display systems the refresh rate (also referred to as "vertical refresh rate", or "vertical scan rate" for Cathode Ray Tubes (CRTs)) is the number of times in a second that the display hardware draws the data it is being given. Refreshing is distinct from the measure of frame rate, in that the refresh rate conventionally includes the repeated drawing of identical frames, while frame rate measures only the rate at which the incoming video changes with respect to time.

Refresh rate is an important consideration in modern display devices. For example on smaller computer displays (e.g., CRTs of less than 14 inches) few people notice any discomfort below refresh rates of 60-72 Hz, while on larger CRT monitors (e.g., >17 inches) persons often experience mild discomfort unless refresh rates are set to a more comfortable 85 Hz or higher. Refresh rates often exceed 100 Hz. Non-CRT display technologies each have their own issues in regard to refreshing.

Overall, in order to provide flicker-free output, modern digital displays are moving toward higher and higher refresh rates to improve motion display. It should be appreciated that conventional support of these high refresh rates requires significant bandwidth to the display.

Frame rate converters have been adopted in some display system devices for building intermediate frames based solely on adjacent frames of information in the received video. These converters attempt to glean information from the transmitted video stream which requires substantial video processing capability while often introducing artifacts into the final picture. In particular, frame rate converters suffer the most when the video includes elements such as closed captioning, subtitles, Really-Simple-Syndication (RSS) feeds, picture-in-picture, and so forth that can not be estimated properly from adjacent frames.

Accordingly, a need exists for a system and method of supporting increased refresh rates without a concomitant bandwidth increase to the video display device or the introduction of artifacts.

BRIEF SUMMARY OF THE INVENTION

The present invention relates to a method for minimizing the bandwidth required to drive high frame rate displays by performing the up-conversion of data at the point of actual display; as contrasted to up-converting the video and sending the high-bandwidth up-converted video to the display device. This method overcomes the shortcomings with frame rate converters as it does not need to "guess" (make unwarranted estimates) at how the intermediate frames should be represented, and does not require extensive video processing. All related processing, including the making of any assumptions, within the present invention are performed during tagging at a stage in the video processing where the "raw" data is available, this raw data can include any additional inputs as desired. To improve the effective refresh rate, and thus motion perception, display frame rates are boosted by variously synthesizing intermediate frames based on information tags along with video data in the bounding real frames.

It will be appreciated that a video comprises a series of sequential frames at a framing rate which is expressed as a number of frames per second (fps). Each frame comprises a plurality of picture elements (pixels) (e.g., 1920×1080) which have color and intensity attributes (e.g., expressed as RGB) that make up the still image of that frame.

Within the present invention tags are created in association with the video, in particular frame tagging and optionally pixel tagging, for incorporating additional information necessary to support increased refresh rates. It will be noted that the frame and pixel tags occupy substantially less space, and thus less bandwidth, than would be required in the sending of the up-converted video itself to a display device.

According to the invention, the original baseband video is tagged and transported to a display device. The tagging is generated, such as during the original data capture, or at any one or more stages before delivery to the display. The video is maintained in its native frame rate until some point within the display device. The method comprises three general stages.

The first step involves tagging of frames, and optionally pixels, that are to be transported to the display system. It will be appreciated that the tag information can include information that is known in response to the original video capture as well as additional information which can be captured at that time (e.g., extra video frames, camera motion values, position, and so forth). For example, in one implementation the original video may be captured at a higher framing rate (e.g., 2×, 4×, or any desired integral or non-integral increase) from which tags are generated for a video at the desired lower frame rate. By way of example and not limitation capture could be performed at a higher rate, such as 48 fps, 64 fps, 96 fps, or other increased rates, from which is generated a lower frame rate video, such as 24 fps, as well as tags including information about the frames and pixels at the higher framing rate. Thereby, the tags can be generated without the need to make assumptions, or without reducing the need to make assumptions, about intermediate frames. Consequently, the information tags can be utilized during up-conversion to generate intermediate frames which approximate the frames which were originally captured at the higher rate. It will also be appreciated that any other desired information can be included in the tags. By way of further example and not limitation, notations can be included in the tags on which scene portions (e.g., certain backgrounds) can be displayed at lower resolution, such as in response to director input or how the shot is being taken (e.g., depth of field) by the camera during capture. One of ordinary skill in the art will appreciate that numerous forms of tag information can be encoded as desired to provide any desired level of control of the just-in-time up-converting.

In addition, tag information is generated at some stage prior to display in response to knowledge about the particular display upon which the video is to be displayed. For example, in one simple implementation of the invention, the tag data indicates the number of times each pixel must be repeated and the direction of the pixel in the next frame into which it will transition for a display having a given refresh rate. Information tags about repeat count and direction are determined in response to the refresh rate of the target display in relation to the native rate of the video.

The second step involves transporting the tagged video information to the display system. The display system may be a separate device, or integrated within other devices. For example, it should be appreciated that in some applications, the display panel is incorporated within the same housing as the electronics which receive or pre-process the video signals (e.g., broadcast/cable receiver, media drives, media reader, network connection, and so forth). The tagged video as utilized according to the present invention consumes substantially less bandwidth in comparison with the up-converted video.

The third step is the up-conversion stage includes generating new frames, which are intermediates between original video frames and based on the originally received frames as well as the tagging information.

Embodiments of the present invention can be implemented within display devices, televisions, or portions thereof, as well as other equipment configured for receiving video for display on a display device. It will be noted that these implementations may include hardware and/or software (e.g., firmware) integrated within various devices, or adapted for execution in relation to these video display devices.

The invention is amenable to being embodied in a number of ways, including but not limited to the following descriptions.

One embodiment of the invention is an apparatus for up-converting video input to synthesize intermediate frames, comprising: (a) means for receiving a video input and associated tag information indicating the manner of replicating frames for a destination display device; (b) means for generating pixels for intermediate frames, based on repeat count and direction values in the tag information, to repeat frames of the video which match the refresh rate of the destination display device, and (c) means for outputting the pixels of the intermediate frames to the drivers (e.g., row and column drivers) of the display device.

One embodiment of the invention is an apparatus for up-converting video input to synthesize intermediate frames, comprising: (a) means for receiving a video input and associated tag information indicating the manner of replicating frames for a destination display device; (b) a computer configured for processing the video input; (c) programming executable on the computer for, (c)(i) generating pixels for intermediate frames, based on repeat count and direction values in the tag information, to repeat frames of the video which match the refresh rate of the destination display device, and (c)(ii) outputting the pixels of the intermediate frames to the drivers (e.g., row and column drivers) of the display device.

It will be appreciated that the inclusion of tag information allows the up-conversion process to be dynamically reconfigured and pixel displacements manipulated when generating intermediate frames. The up-conversion is performed after receipt of the tagged video, such as within a display device, or more preferably within the timing controller of the destination display device. In at least one implementation, pixels are output to a gamma corrector for immediate display on the screen of the destination display device. Tag information is preferably communicated to the destination display within the video stream itself, such as contained within at least one pseudo pixel following the frame synchronization bit, thus alleviating the need for synchronization constructs which would be required if the tag information were retained in a separate stream.

In at least one simple embodiment, tag information comprises frame tag data having a repeat count which indicates the number of times each pixel must be duplicated and the direction of the pixel in the next frame. For example, each frame tag contains a direction indicating which of the temporally adjacent pixels resemble the original pixel.

In at least one embodiment of the invention, each pixel can be tagged with its own direction so that pixels in the frame can be controlled in response to different movement characteristics than are exhibited by other pixels in the frame. For example, in at least one embodiment, an intermediate raster is generated from a tag raster which contains panning information for each pixel. Pixels are then generated for intermediate frames in response to extracting vector information from this tag raster. In at least one mode, panning information is included within the tag information, to indicate which of a number of pan groups that each frame and/or pixel belongs.

One embodiment of the invention is an apparatus for up-converting video input to synthesize intermediate frames, comprising: (a) means for registering a video input and associated tag information indicating the manner of replicating frames for a destination display device; (b) means for generating an intermediate raster from a tag raster, within the tag information, which contains panning information for each pixel, (c) means for generating pixels in response to extracting vector information from the tag raster, and (d) means for outputting the pixels to the drivers (e.g., row/column drivers) of the display device.

One embodiment of the invention is an apparatus for up-converting video input to synthesize intermediate frames, comprising: (a) a receiver adapted for registering a video input and associated tag information indicating the manner of replicating frames for a destination display device; (b) a computer configured for processing the video input; (c) programming executable on the computer for, (c)(i) generating an intermediate raster from a tag raster, within the tag information, which contains panning information for each pixel, (c)(ii) generating pixels in response to extracting vector information from the tag raster, and (c)(iii) outputting the pixels to the drivers (e.g., row/column drivers) of the display device.

One embodiment of the invention is a method of up-converting video at the display device based on tagging, comprising: (a) generating tag information for a video, wherein the tag information indicates how each frame, and optionally pixel, are to be replicated for a destination display device; (b) communicating the video and associated tag information to a destination display device; and (c) up-converting the video in response to tag information, the up-converted video having a refresh rate matching the destination display device, wherein the video and its associated tag information consume less bandwidth than the up-converted video.

The present invention provides a number of beneficial aspects which can be implemented either separately or in any desired combination without departing from the present teachings.

An aspect of the invention is a method and apparatus for increasing display refresh rates without the need for substantially increasing video bandwidth to the display device.

Another aspect of the invention provides a means for boosting display frame rates in response to the generation of intermediate video frames.

Another aspect of the invention provides for driving high frame rate displays while requiring a minimum baseband data transmission.

Another aspect of the invention provides for generation of refresh frames based on frame tags indicating repeat count and direction.

Another aspect of the invention provides for generation of refresh frames based on frame tags and pixel tags, which collectively determine how each intermediate frame is to be generated from the original frames.

Another aspect of the invention provides generation of refresh frames which include panning vector information for each of the frame pixels.

Another aspect of the invention is method which uses panning information indicating which of a number of pan groups that each pixel belongs.

Another aspect of the invention is a display device having integral up-conversion in response to receipt of video and associated information tagging.

Another aspect of the invention is the inclusion of information tagging within the video itself, such as within one or more pseudo pixels following frame synchronization.

Another aspect of the invention provides for increasing refresh rates by up-converting a video which is output through a gamma corrector to the drivers (e.g., row and column) of a display device.

Another aspect of the invention provides for increasing refresh rates while maintaining video in its native frame rate until the video data is ready for output by the driver circuits on the display panel.

Another aspect of the invention provides for increasing refresh rates by agglomerating tag information with the video for use in dynamically configuring the up-converter and manipulating pixel displacements for synthesized (intermediate) frames.

Another aspect of the invention provides for increasing refresh rates while retaining traditional fixed pixel lengths or selecting variable pixel lengths to further conserve bandwidth.

Another aspect of the invention is a method of increasing display refresh rates for use with a variety of display devices.

Another aspect of the invention is a method of increasing display refresh rates while still providing detailed control of the up-conversion process.

A still further aspect of the invention is that of generating intermediate frames during up-conversion which preserve both sharp edges and crisp scene changes.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1 through FIG. 6. It will be appreciated that the apparatus may vary as to configuration and as to details of the parts, and that the method may vary as to the specific steps and sequence, without departing from the basic concepts as disclosed herein. Tables are included at the end of this specification.

1. Introduction.

A method of video data encoding and processing to drive high frame rate displays while necessitating only a minimum baseband data transmission that includes information tags. This invention relies on frame and pixel tags to minimize the amount of data that needs to be transported to a display device while still providing detailed control of the up-conversion process.

As the present invention is preferably utilized for minimizing video bandwidth communicated into the midst of the video display device, it is also referred to herein as "just-in-time up-conversion", which is contrasted to performing of an up-conversion before the video is received by the display controller.

In a conventional display system the display device just displays the information exactly as received with the refresh built into the signal received. In adopting frame rate converters, however, the same sort of a video signal is received, but processing within the target device attempts to synthesize intermediate images based on primary images and thus generate intermediate refresh frames. In contrast to these, it has been appreciated in arriving at the present invention that communicating a video signal for direct display or for use by a frame rate converter, is itself a source of many shortcomings. The present invention provides for one or more levels of information tagging which can be used just in time as the video is being output, therein reducing processing overhead and assuring a clean output into which artifacts have not been introduced.

Just-in-time up-conversion utilizes frame and pixel tagging to minimize the data bandwidth required to drive a display. With this approach video is maintained in its native format, including frame rate, until received within the display device, and more preferably to the point of the row/column drivers on the display panel. Tag data is used to dynamically configure the up-converter and manipulate pixel displacements for synthesized frames. Traditional fixed pixel lengths may be utilized in the data stream or variable pixel lengths selected to further conserve communications bandwidth.

2. Tagging, Transport and Up-Conversion.

Just-in-time up-conversion according to the invention involves three general stages: (1) tagging, (2) transport and (3) up-conversion. It facilitates physical separation of the tagging and up-conversion subsystems.

Figure 1:
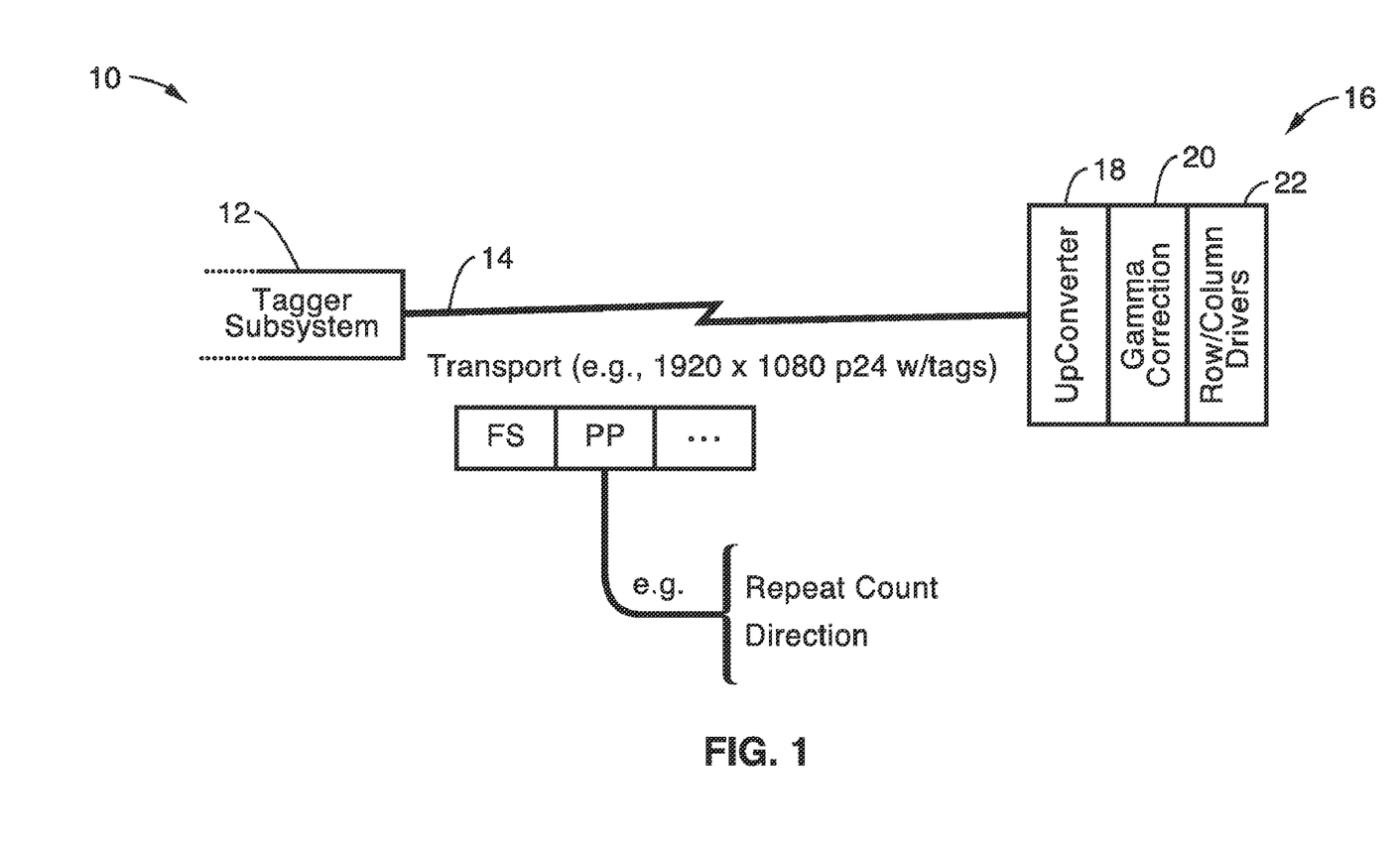
FIG. 1 is a block diagram of just-in-time up-conversion according to an embodiment of the present invention.

FIG. 1 illustrates, by way of example embodiment 10, the elements of the present system for reducing the bandwidth requirements to a high refresh rate display system. A tagger subsystem 12 is shown for generating a set of information tags (e.g., frame tags and optionally pixel tags) for a video to be displayed at a desired resolution and refresh rate at a display device. Video and tag information are then communicated 14 to a display device 16. An example of the tag information is depicted as a bit string, showing at least one pseudo pixel (PP) following a frame synchronization (FS) bit. In the figure, the tag information is exemplified within the pseudo pixel as a "Repeat Count", and "Direction". Tag information is used within an up-converter 18 to generate intermediate frames for the received video. Output from the up-converter is gamma corrected in block 20 and directed to the low level drivers 22 within the display device, such as input to the row and column drivers of the display.

Tagging is performed anywhere prior to the up-conversion process, such as preferably part of image preparation from the original capture, and/or anywhere else in the workflow process prior to video display delivery. By way of example and not limitation, within a television this up-conversion might be performed as part of compositing, scaling, or other similar post processing steps. It should be appreciated that the tagging process involves inclusion of actual information from the video or other information collected with or for the video, while it may also include implied information based upon the image-sequence and analysis thereof.

During the transport stage, video information is conveyed between subsystems, such as from a video source device which for example may be "playing" the video, to a display device (e.g., monitor, display screen, television, and so forth). The video stream and the tag information is configured to consume minimal bandwidth in comparison with transporting video which has already been up-converted.

3. Tagging Formats.

Tagging data can be configured in many formats without departing from the teachings of the present invention. By way of example and not limitation, one example is that of retaining the tag information within at least one pseudo pixel immediately following the frame synchronization signal. At this point, for instance, it is assumed that the frame size exactly matches the native resolution of the panel, although the tagging and up-conversion of the invention can support resolution changes as desired.

4. Frame Tagging.

This frame tag data, for example, indicates the number of times each pixel must be duplicated and the direction of the pixel in the next frame into which it will transition.

Table 1, found at the end of the specification, illustrates by way of example a simple implementation of a refresh generation formula which precludes the need to transmit up-converted frames over an interface to the display device. In a simple implementation, repeat count is determined by the ratio of the frame rate versus the refresh rate. For example, a repeat count of 5 would be used for a native video frame rate of 24 when displaying on a display panel adapted for a 120 Hz refresh rate.

The direction parameter is encoded to indicate which of the next adjacent pixels in time resemble the original pixel—specifically the pixel in the same position of the following refresh frame, the one above or the one below. It will be appreciated, that in response to a scene change, the next frame in the time sequence may have no known relationship to the previous frame.

Table 2 depicts one possible set of encoding. It should be noted that according to one simple example embodiment, these two pieces of information would be utilized by the up-converter in generating the pixels for each of the intermediate frames.

5. Pixel Tagging.

In more sophisticated embodiments, pixel tag data can be utilized in addition to frame tag data. Instead of a direction tag being applied to all pixels in a frame, as exemplified above, each pixel may be tagged with its own direction. This pixel tagging permits pixels within the frame to be subject to different movement characteristics from the rest of those in the frame. Use of this enhancement provides for the generation of composite frames in which sharp edges and crisp scene changes are preserved.

Figure 2:
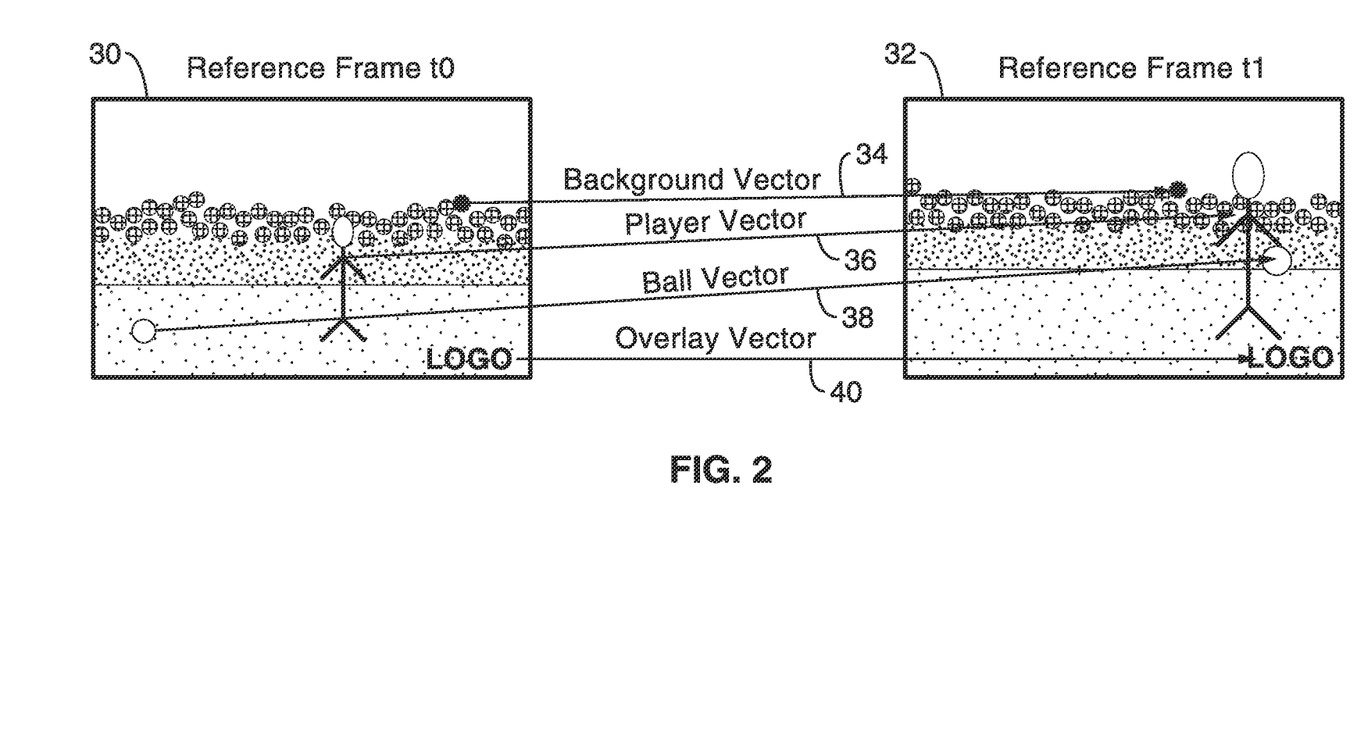
FIG. 2 is a block diagram of vector pixel tagging according to an aspect of the present invention, showing changes between a reference frame t0 and later reference frame t1.

FIG. 2 illustrates the use of frame and pixel tags for passing panning information. Pixels are tagged to indicate which panning vector and/or algorithm should be used for that pixel. The frame tag preferably includes details about the vectors used for pixel tagging. Any number of these vectors, or more preferably layers thereof, can be supported. Pan changes can be seen moving from a first frame 30 (reference frame t0) to a second frame 32 (reference frame t1). As an example, imagine the scene of FIG. 2 containing three distinct pans: a sports crowd 34, a player 36, and a ball 38. By way of example, the pixels representing the crowd would be tagged as using the background pan, the player pixels tagged as a midrange pan, and the ball tagged as a foreground pan. There may also exist any other desired number of layers, such as a superimposed overlay 40. Each pan is preferably "prioritized" with foreground being highest and background (default) the lowest. The frame tags detail the motion vector for each of the pans and might also include zoom change information as well.

Figure 3:
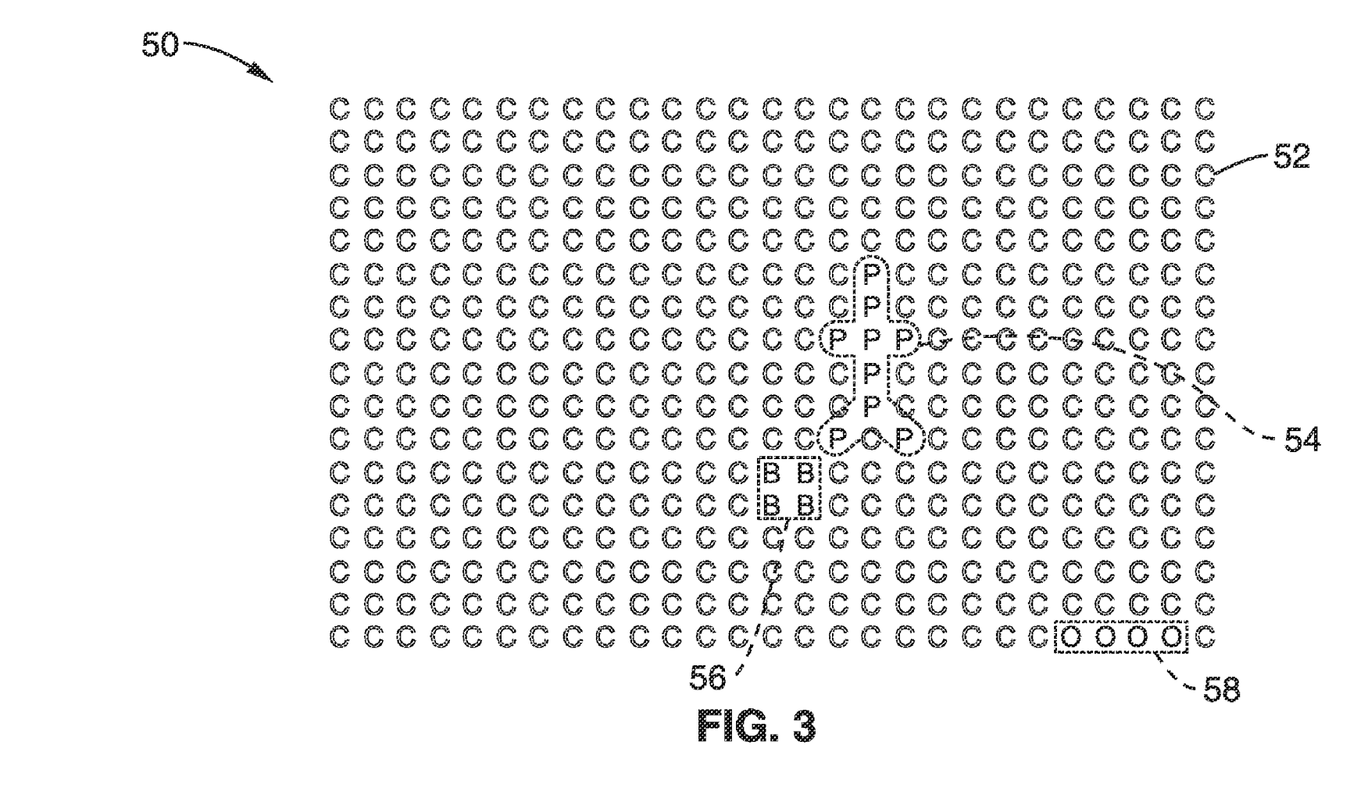
FIG. 3 is a pixel array map of a tag raster according to the present invention showing different vector planes represented by different character symbols.

FIG. 3 illustrates by way of example, a first step of generating an intermediate raster which is that of building a "tag raster" 50 of the pixel tags. This tag raster is much smaller (memory requirements) than a video raster since each pixel is represented by just its vector tag. It could even be implemented as a register buffer, which for example is initialized by being flushed (filled) with the background tag. In the first phase, the tag for each pixel of the reference raster is projected into the new tag raster. If the projected tag has a higher priority than that of the tag in that location, it is replaced by the projected tag. FIG. 3 depicts a tag raster for between the example reference frames of FIG. 2, in which "C" represents a crowd pan 52, "P" represents a player 54, "B" represents a ball 56 and "O" represents an overlay 58.

In the second phase, the tag raster is traversed and the tag at each location is used to select the vector to "pull" the appropriate pixel data from the reference raster. This pixel value is passed to the gamma corrector for immediate display on the screen. In a variation of this the pulled pixels are blended with their new neighbors.

It should be appreciated that if the tag raster is double buffered, there would exist no frame latency for processing. The first reference frame would be displayed in real time while the first tag raster is generated. As a tag raster is being displayed in real time, the next tag raster would be created.

In one embodiment, zoom differences are noted in a tag which serve to propagate a tag over different tag extents (e.g., more or fewer tags) in a tag raster as appropriate by the direction of the zoom change.

In yet another variation, a frame tag indicates gamma correction data rather than true pixels. This gamma data could be used in a content addressable memory or similar device to translate the numeric pixel levels to the analog levels needed to produce the corresponding color.

Other variations on these embodiments can also be implemented. By way of example, in one variation direct backlight controls are permitted, such as those implemented as zones (e.g., LED backlight). Still other variants would allow every other line to be considered as a pair to support stereoscopic interlace. It will be appreciated by one of ordinary skill in the art that numerous variations and combinations can be put forth without departing from the teachings of the present invention.

6. Pixel Tagging.

Figure 4:
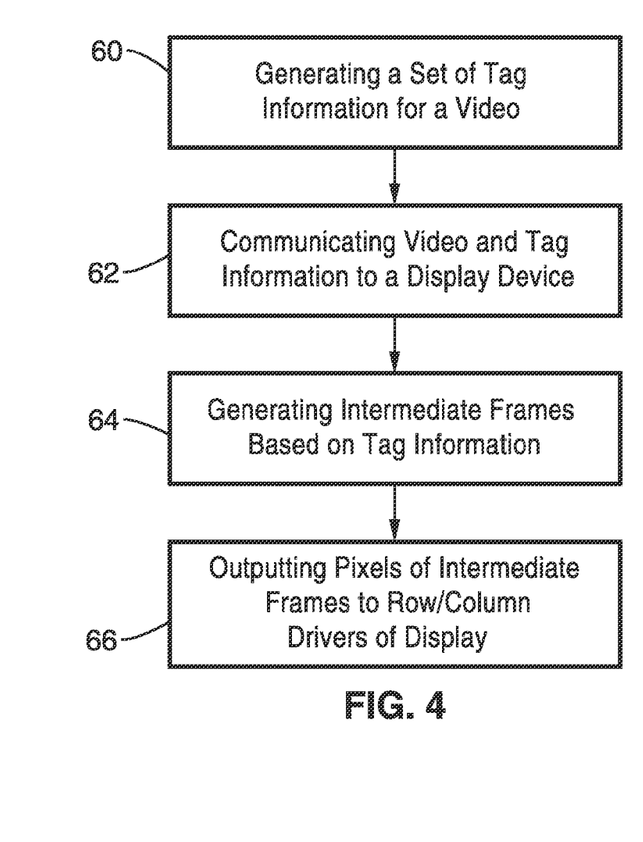
FIG. 4 is a flow diagram of the general method of performing just-in-time up-conversion according to an aspect of the present invention.
Figure 5:
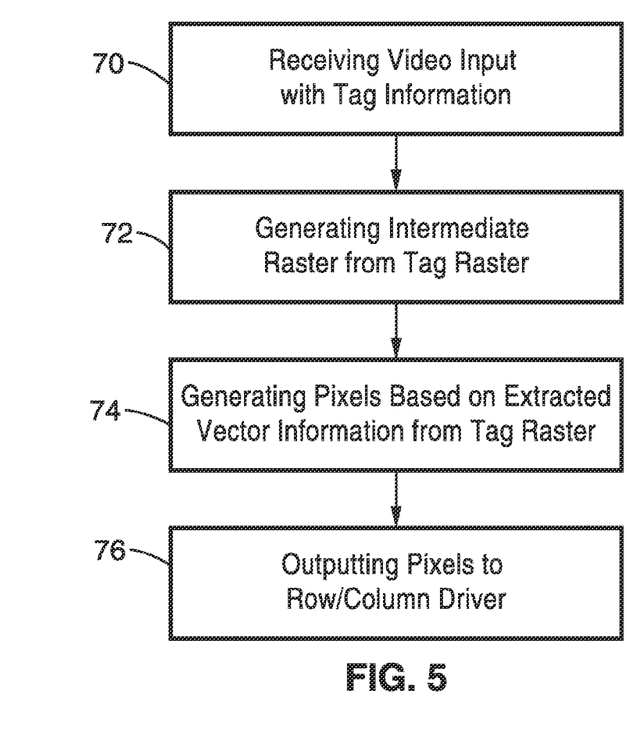
FIG. 5 is a flow diagram of the performing just-in-time up-conversion according to an aspect of the present invention, showing use of tag raster.

FIG. 4 and FIG. 5 illustrate examples of the up-conversion process according to embodiments of the present invention.

In FIG. 4 a generalized process of frame tagging is shown. Represented by block 60 a set of tag information is generated for a video. Video along with tag information is then communicated (transmitted) to a display device as in block 62. The tag information increases video bandwidth by an amount on the order of less than about 10%. It will be recognized, however, that conventionally sending the up-converted video would require on the order of 400% increase in necessary bandwidth to the display device. Upon receipt of the video and tag information, the tag information is utilized as depicted in block 64 for extending the frames as necessary and generating intermediate frames in response to the refresh rate of the target display device. Pixels are output in block 66 for the intermediate frames to the low level drivers within the display device.

In FIG. 5 an embodiment of tag processing is shown including pixel level tagging. This figure depicts only the just-in-time up-conversion aspects, although it should be appreciated that some associated tagging process would have necessarily preceded it. It should be appreciated that the present invention provides an inventive information tagging process/apparatus, inventive up-conversion process/apparatus based on the tagging, and/or inventive process/apparatus for performing the combination of tagging, communication of video and tagging and the just-in-time up-conversion.

Referring to the figure, a video input is received in block 70, including the tag information. An intermediate raster is generated in block 72 from a tag raster whose information is received as panning information for each pixel. Pixels are then generated in block 74 based on vector information from the tag raster. Pixels are output to the display driver in block 76, such as to the row and column drivers.

In a preferred embodiment of the present invention, any substantial video processing (e.g., high computational overhead) is preferably performed during video pre-processing, for example changing resolution of a native video (e.g., up-scaling), or similar. However, it will be appreciated that processing, such as up-scaling, can be alternately performed during the up-conversion process according to the present invention. One of ordinary skill in the art will appreciate that a number of variations on the tagging and up-conversion can be utilized according to the present invention based on the teachings herein.

7. Display Hardware Supporting Up-Conversion.

The up-conversion stage is intended to provide a "processing thin" environment, wherein up-conversion processing is facilitated with a minimal amount of electronics. In at least one embodiment, the processing of the present invention is integrated within the timing controller (TCON) on a display panel, or other form of display device. By way of example, only analog processing, such as gamma correction, is preferably applied prior to controlling the output of the actual pixels of the display. By way of further example, consider an LCD TV set having a first processor which outputs video across a short low-voltage differential signaling (LVDS) cable to the panel processor of the up-converter/TCON board. In this example, the up-converter according to the present invention is preferably only implemented on TV sets which support refresh rates above a given threshold, such as 100 Hz. The TCON may for instance be mounted directly to the back of the "glass" of the display and have as its output, the lines that assert the drive voltage appropriate for each pixel along one axis and an enable signal on the other. It should be appreciated that the present invention can be applied to various display technologies without departing from the teachings of the present invention, for example conventional raster devices, LCDs, OLED, plasma, and so forth without limitation.

Figure 6:
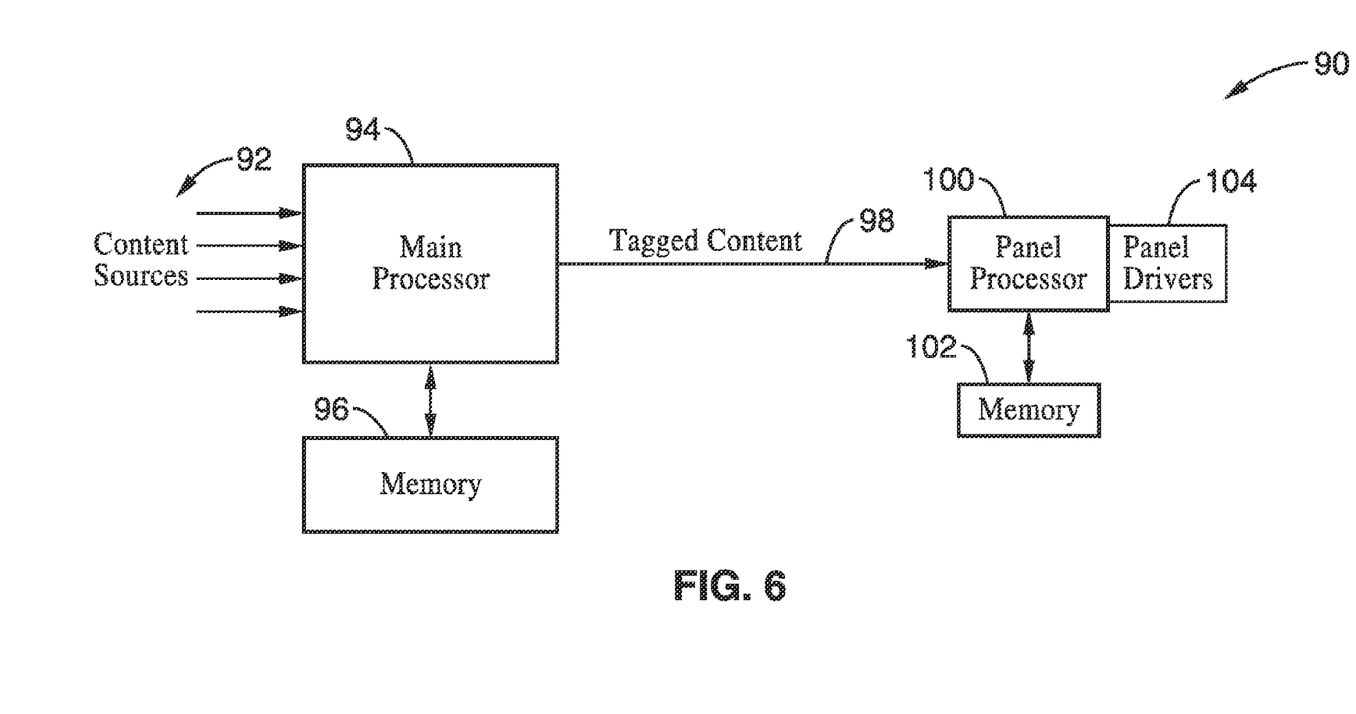
FIG. 6 is a block diagram of a display device according to an embodiment of the present invention, as shown with processor and memory for carrying out the present invention.

FIG. 6 illustrates an example embodiment 90 of up-conversion implemented within a display control system. A set of video content sources 92 are shown being received by a first processor 94 coupled to memory 96. This processor may be configured for performing operations on the video sources, such as decoding, scaling, changing resolution, sharpening, and generating composite output. Memory 96 represents any desired combination of RAM, ROM, FLASH, media forms, or external memory as desired. A portion of memory 96 retains programming executable on first processor 94, while another portion provides a scratch pad buffer for use by processor 94. In summary, first processor 94 in combination with memory 96 can be considered to handle pre-processing of the video.

Tagged video content is output from first processor 94 and directed over a link 98 to a display panel having panel processor 100, associated memory 102, and panel drivers 104. It should be appreciated that the first processor can be remote from the panel processor, or alternatively contained within the same housing as the display panel. Panel processor 100 utilizes the tagged video content to assemble the final raster images (both original primary images and synthesized intermediate images). Panel processor 100 uses tag information to up-convert the video for output through the panel drivers 104. In a preferred embodiment, panel processor 100 does not require the same level of video processing capability as provided by the first processor. Panel drivers 104 convert the signals received from the panel processor into signals for driving the display and its pixels.

8. Conclusions.

The use of "just-in-time up-conversion" as detailed herein, reduces data transfer needs down to a manageable level until the very last step in the video delivery process while providing control down to the pixel level. Even adding three bits to each 30 bit pixel increases bandwidth by only 10% as compared to 400% for conventional up-conversion from 60 Hz to 240 Hz. The efficiency improvements are larger when considering conversion from native 24 fps video for driving a display having a refresh rate of 240 Hz. The efficiency rate is also boosted as the number of bits per pixel increases. Accordingly, a 24 fps 1920*1080 30 bit video would require less than 1.7 Gbps of connection bandwidth, while less than 7 Gbps would be required in communicating a 4K×2K 24 fps video.

As can be seen, therefore, the present invention includes the following inventive embodiments among others:

1. An apparatus for up-converting video input to synthesize intermediate frames, comprising:
  (a) means for receiving a video input and associated tag information indicating a manner by which frames are to be replicated on a destination display device;
  (b) a computer configured for processing the video input for the destination display device; and
  (c) programming executable on said computer for,
    (i) generating pixels for intermediate frames, based on repeat count and direction values in said tag information, to repeat frames of the video input to match a refresh rate of the destination display device, and
    (ii) outputting pixels of said intermediate frames to row and column drivers of the destination display device.

2. An apparatus as recited in claim 1, wherein said tag information allows up-converting to be dynamically reconfigured and pixel displacements manipulated.

3. An apparatus as recited in claim 1, wherein said up-converting is performed within a timing controller of the destination display device.

4. An apparatus as recited in claim 1, further comprising:
  generating an intermediate raster from a tag raster, within said tag information, which contains panning information for each pixel; and
  generating pixels in response to extracting vector information from said tag raster.

5. An apparatus as recited in claim 1, wherein said tag information comprises frame tag data having a repeat count indicating how many times each pixel must be duplicated and the direction of a corresponding pixel in the next frame.

6. An apparatus as recited in claim 1:
  wherein said tag information comprises frame tag data having a repeat count indicating how many times each pixel must be duplicated and direction of the pixel in the next frame; and
  wherein said frame tag data has a direction indicating which of temporally adjacent pixels resemble the original pixel.

7. An apparatus as recited in claim 1, wherein each pixel can be tagged with its own direction so that pixels in a frame can have different movement characteristics from other pixels in the frame.

8. An apparatus as recited in claim 1, wherein said tag information is retained in at least one pseudo pixel immediately following a frame synchronization bit.

9. An apparatus as recited in claim 1, wherein pixels are output to a gamma corrector for immediate display on a screen of the destination display device.

10. An apparatus as recited in claim 1, further comprising registering panning information within said tag information, said panning information indicating which of a number of pan groups that each frame and/or pixel belongs.

11. An apparatus for up-converting video input to synthesize intermediate frames, comprising:
  (a) a receiver adapted for registering a video input and associated tag information indicating a manner for replicating frames for a destination display device;
  (b) a computer configured for processing the video input; and
  (c) programming executable on said computer for,
    (i) generating an intermediate raster from a tag raster, within said tag information, which contains panning information for each pixel,
    (ii) generating pixels in response to extracting vector information from said tag raster, and
    (iii) outputting pixels to pixel driver circuits within the destination display device.

12. An apparatus as recited in claim 11, wherein said tag information allows up-converting to be dynamically reconfigured and pixel displacements manipulated.

13. An apparatus as recited in claim 11, wherein said up-converting is performed within a timing controller of the destination display device.

14. A method of up-converting video at a display device based on tagging, comprising:
  generating tag information for a video;
  said tag information indicating how each frame and pixel are to be replicated for a destination display device;
  communicating said video and associated tag information to the destination display device; and
  up-converting said video in response to tag information, said up-converted video having a refresh rate matching the destination display device;
  wherein said video and its associated tag information consume less bandwidth than up-converted video.

15. A method as recited in claim 14, wherein said frame tag data has a repeat count indicating how many times each pixel must be duplicated and the pixel direction in a succeeding frame.

16. A method as recited in claim 14, wherein said frame tag data has a direction indicating which temporally adjacent pixels resemble the original pixel.

17. A method as recited in claim 14, wherein each pixel can be tagged with its own direction so that pixels in the frame can have different movement characteristics from the rest of those in the frame.

18. A method as recited in claim 14, wherein said tag information is retained in at least one pseudo pixel following at least one frame synchronization bit.

19. A method as recited in claim 14, further comprising gamma correction of up-converted video.

20. A method as recited in claim 14, further comprising registering panning information within said tag information, said panning information indicating which of a number of pan groups that each frame, or pixel, belongs.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Repeat Counts for Different Frame and Refresh Rates

| Frame Rate | Refresh Rate | |
| --- | --- | --- |
| fps | 120 Hz | 240 Hz |
| 24 | 5 | 10 |
| 30 | 4 | 8 |
| 60 | 2 | 4 |

TABLE 2

Example Direction Encoding Values

| Code | Meaning |
| --- | --- |
| 000 | No Relationship |
| 001 | Same Position |
| 010 | Above and Same |
| 011 | Above |
| 110 | Same and Below |
| 111 | Below |

What is claimed is:

1. An apparatus for up-converting video input to synthesize intermediate frames, comprising:
   means for receiving a video input and associated tag information indicating a manner by which frames are to be replicated on a destination display device;
   a computer configured for processing the video input for the destination display device; and
   programming executable on said computer for:
   generating pixels for intermediate frames, based on repeat count and direction values in said tag information, to repeat frames of the video input to match a refresh rate of the destination display device;
   wherein said tag information is retained in at least one pseudo pixel within said video input having associated tag information; and
   outputting pixels of said intermediate frames to row and column drivers of the destination display device.

2. An apparatus as recited in claim 1, wherein said tag information allows up-converting to be dynamically reconfigured and pixel displacements manipulated.

3. An apparatus as recited in claim 1, wherein said up-converting is performed within a timing controller of the destination display device.

4. An apparatus as recited in claim 1, further comprising programming executable on said computer for:
   generating an intermediate raster from a tag raster, within said tag information, which contains panning information for each pixel; and
   generating pixels in response to extracting vector information from said tag raster.

5. An apparatus as recited in claim 1, wherein said tag information comprises frame tag data having a repeat count indicating how many times each pixel must be duplicated and the direction of a corresponding pixel in the next frame.

6. An apparatus as recited in claim 1:
   wherein said tag information comprises frame tag data having a repeat count indicating how many times each pixel must be duplicated and direction of the pixel in the next frame; and
   wherein said frame tag data has a direction indicating which of temporally adjacent pixels resemble the original pixel.

7. An apparatus as recited in claim 1, wherein each pixel can be tagged with its own direction so that pixels in a frame can have different movement characteristics from other pixels in the frame.

8. An apparatus as recited in claim 1, wherein said tag information is retained in at least one pseudo pixel immediately following a frame synchronization bit.

9. An apparatus as recited in claim 1, wherein pixels are output to a gamma corrector for immediate display on a screen of the destination display device.

10. An apparatus as recited in claim 1, further comprising programming executable on said computer for registering panning information within said tag information, said panning information indicating which of a number of pan groups that each frame and/or pixel belongs.

11. An apparatus for up-converting video input to synthesize intermediate frames, comprising:
   a receiver adapted for registering a video input and associated tag information indicating a manner for replicating frames for a destination display device;

a computer configured for processing the video input; and programming executable on said computer for:

generating an intermediate raster from a tag raster, within said tag information, which contains panning information for each pixel;

wherein pixels are tagged within said panning information to indicate which panning vector and/or algorithm should be used for that pixel;

generating pixels in response to extracting vector information from said tag raster; and outputting pixels to pixel driver circuits within the destination display device.

12. An apparatus as recited in claim 11, wherein said tag information allows up-converting to be dynamically reconfigured and pixel displacements manipulated.

13. An apparatus as recited in claim 11, wherein said up-converting is performed within a timing controller of the destination display device.

14. A method of up-converting video at a display device based on tagging, comprising:

generating tag information for a video;

said tag information is retained in at least one pseudo pixel within said video indicating how each frame and pixel are to be replicated for a destination display device;

communicating said video and associated tag information to the destination display device; and up-converting said video in response to tag information, said up-converted video having a refresh rate matching the destination display device;

wherein said video and its associated tag information consume less bandwidth than up-converted video.

15. A method as recited in claim 14, wherein said frame tag data has a repeat count indicating how many times each pixel must be duplicated and the pixel direction in a succeeding frame.

16. A method as recited in claim 14, wherein said frame tag data has a direction indicating which temporally adjacent pixels resemble the original pixel.

17. A method as recited in claim 14, wherein each pixel can be tagged with its own direction so that pixels in the frame can have different movement characteristics from the rest of those in the frame.

18. A method as recited in claim 14, wherein said tag information is retained in at least one pseudo pixel following at least one frame synchronization bit.

19. A method as recited in claim 14, further comprising gamma correction of up-converted video.

20. A method as recited in claim 14, further comprising registering panning information within said tag information, said panning information indicating which of a number of pan groups that each frame, or pixel, belongs.

21. An apparatus for up-converting video input to synthesize intermediate frames, comprising:

means for receiving a video input and associated tag information indicating a manner by which frames are to be replicated on a destination display device;

a computer configured for processing the video input for the destination display device; and programming executable on said computer for:

generating pixels for intermediate frames, based on repeat count and direction values in said tag information, to repeat frames of the video input to match a refresh rate of the destination display device;

wherein said tag information is retained in at least one pseudo pixel immediately following a frame synchronization bit; and outputting pixels of said intermediate frames to row and column drivers of the destination display device.

22. An apparatus as recited in claim 11, wherein said vector information is within a frame tag containing information about vectors used for pixel tagging.

23. An apparatus as recited in claim 22, wherein said frame tag contains information about any number of vectors used for pixel tagging, and / or layers of vectors used for pixel tagging.

* * * * *